(12) United States Patent
Wang et al.

(10) Patent No.: US 11,594,008 B2
(45) Date of Patent: Feb. 28, 2023

(54) METHOD AND APPARATUS FOR ESCAPE REORDER MODE USING A CODEBOOK INDEX FOR NEURAL NETWORK MODEL COMPRESSION

(71) Applicant: TENCENT AMERICA LLC, Palo Alto, CA (US)

(72) Inventors: Wei Wang, Palo Alto, CA (US); Wei Jiang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 321 days.

(21) Appl. No.: 17/085,212

(22) Filed: Oct. 30, 2020

(65) Prior Publication Data

US 2021/0248410 A1 Aug. 12, 2021

Related U.S. Application Data

(60) Provisional application No. 62/975,481, filed on Feb. 12, 2020.

(51) Int. Cl.
*G06V 10/00* (2022.01)
*G06V 10/424* (2022.01)
*G06F 9/38* (2018.01)
*G06N 3/08* (2023.01)

(52) U.S. Cl.
CPC .......... *G06V 10/424* (2022.01); *G06F 9/3836* (2013.01); *G06N 3/08* (2013.01)

(58) Field of Classification Search
CPC ....... G06V 10/424; G06F 9/3836; G06N 3/08

USPC .......................................................... 382/203
See application file for complete search history.

(56) References Cited

U.S. PATENT DOCUMENTS

| 5,968,162 A * | 10/1999 | Yard | G06F 9/30076 |
| | | | 712/E9.035 |
| 7,079,052 B2 * | 7/2006 | Lamy | H03M 7/40 |
| | | | 341/67 |
| 2013/0007546 A1 * | 1/2013 | Grady | G01R 31/31835 |
| | | | 714/E11.155 |

(Continued)

OTHER PUBLICATIONS

Video Subgroup, "Description of Core Experiments on Compression of neural networks for multimedia content description and analysis", ISO/IEC JTC1/SC29/WG11/N18782, Oct. 2019, pp. 1-14, Geneva, CH.

(Continued)

*Primary Examiner* — Pakee Fang
(74) *Attorney, Agent, or Firm* — Sughrue Mion, PLLC

(57) ABSTRACT

A method of an escape reorder mode for neural network model compression, is performed by at least one processor, and includes determining whether a frequency count of a codebook index included in a predicted codebook is less than a predetermined value, the codebook index corresponding to a neural network. The method further includes, based on the frequency count of the codebook index being determined to be greater than the predetermined value, maintaining the codebook index, and based on the frequency count of the codebook index being determined to be less than the predetermined value, assigning the codebook index to be an escape index of 0 or a predetermined number. The method further includes encoding the codebook index, and transmitting the encoded codebook index.

20 Claims, 6 Drawing Sheets

(56) References Cited

U.S. PATENT DOCUMENTS

2019/0181976 A1* 6/2019 Golitschek Edler von Elbwart ... H04L 1/0004

OTHER PUBLICATIONS

Video Subgroup, "Working Draft 2 of Compression of neural networks for multimedia content description and analysis", ISO/IEC JTC1/SC29/WG11/N18784, Oct. 2019, pp. 1-26, Geneva, CH.
Video Subgroup, "Test model 2 of Compression of neural networks for multimedia content description and analysis", ISO/IEC JTC1/SC29/WG11/N18785, Oct. 2019, pp. 1-10, Geneva, CH.

* cited by examiner

METHOD AND APPARATUS FOR ESCAPE REORDER MODE USING A CODEBOOK INDEX FOR NEURAL NETWORK MODEL COMPRESSION

CROSS-REFERENCE TO RELATED APPLICATION

This application claims priority from U.S. Provisional Patent Application No. 62/975,481, filed on Feb. 12, 2020, in the U.S. Patent and Trademark Office, the disclosure of which is incorporated herein by reference in its entirety.

BACKGROUND

Success of Deep Neural Networks (DNNs) in a large range of video applications such as semantic classification, target detection/recognition, target tracking, video quality enhancement, etc. poses a need for compressing DNN models. Therefore, the Motion Picture Experts Group (MPEG) is actively working on the Coded Representation of Neural Network standard (NNR) that is used to encode DNN models to save both storage and computation.

SUMMARY

According to embodiments, a method of an escape reorder mode for neural network model compression, is performed by at least one processor, and includes determining whether a frequency count of a codebook index included in a predicted codebook is less than a predetermined value, the codebook index corresponding to a neural network. The method further includes, based on the frequency count of the codebook index being determined to be greater than the predetermined value, maintaining the codebook index, and based on the frequency count of the codebook index being determined to be less than the predetermined value, assigning the codebook index to be an escape index of 0 or a predetermined number. The method further includes encoding the codebook index, and transmitting the encoded codebook index.

An apparatus for an escape reorder mode for neural network model compression, includes at least one memory configured to store program code, and at least one processor configured to read the program code and operate as instructed by the program code, the program code including first determining code configured to cause the at least one processor to determine whether a frequency count of a codebook index included in a predicted codebook is less than a predetermined value, the codebook index corresponding to a neural network. The program code further includes maintaining code configured to cause the at least one processor to, based on the frequency count of the codebook index being determined to be greater than the predetermined value, maintain the codebook index, and assigning code configured to cause the at least one processor to, based on the frequency count of the codebook index being determined to be less than the predetermined value, assign the codebook index to be an escape index of 0 or a predetermined number. The program code further includes encoding code configured to cause the at least one processor to encode the codebook index, and transmitting code configured to cause the at least one processor to transmit the encoded codebook index.

A non-transitory computer-readable medium stores instructions that, when executed by at least one processor for an escape reorder mode for neural network model compression, cause the at least one processor to determine whether a frequency count of a codebook index included in a predicted codebook is less than a predetermined value, the codebook index corresponding to a neural network. The instructions, when executed by the at least one processor, cause the at least one processor to, based on the frequency count of the codebook index being determined to be greater than the predetermined value, maintain the codebook index, based on the frequency count of the codebook index being determined to be less than the predetermined value, assign the codebook index to be an escape index of 0 or a predetermined number, encode the codebook index, and transmit the encoded codebook index.

DETAILED DESCRIPTION

Figure 1:
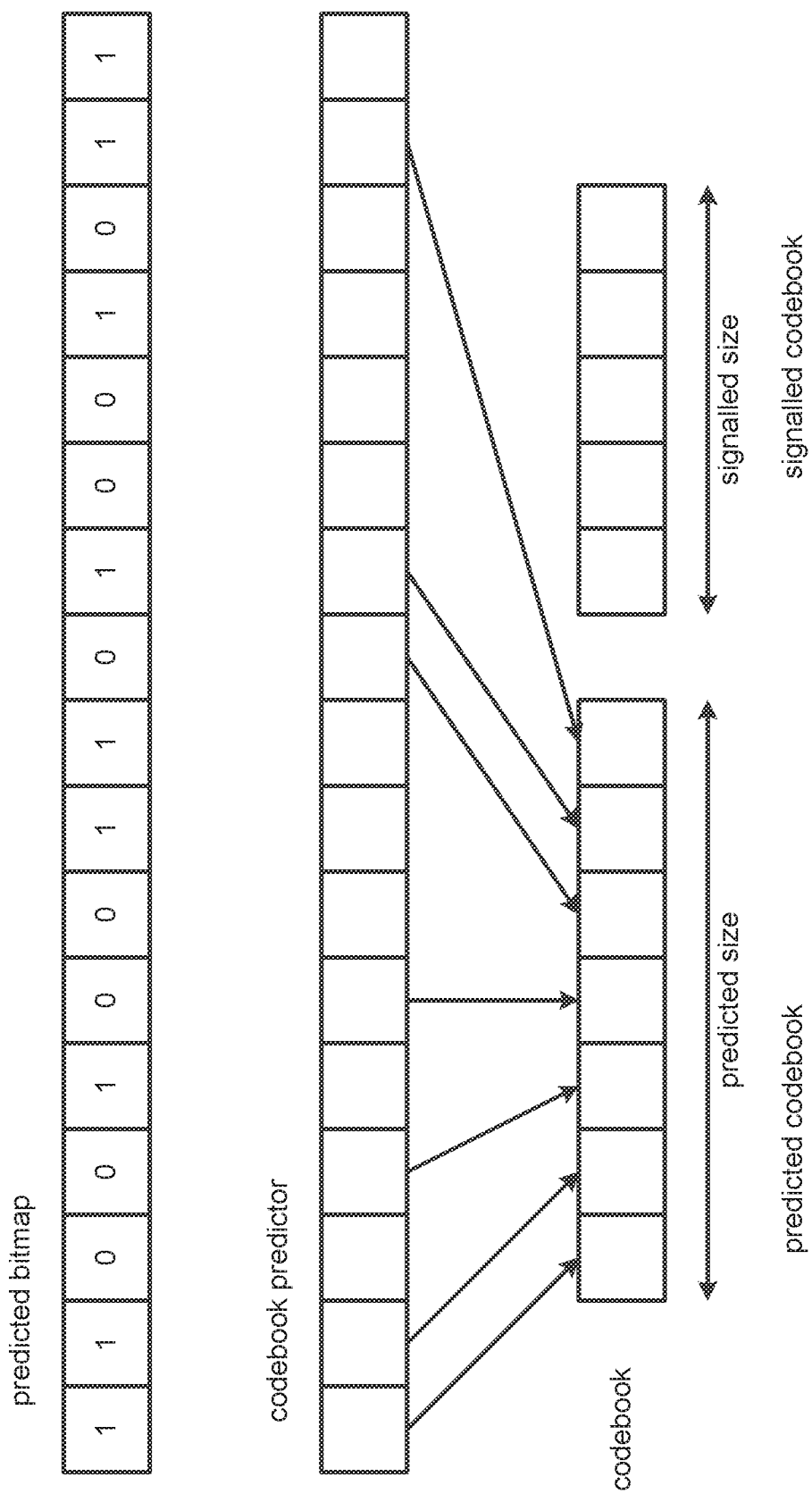
FIG. 1 is a diagram of a codebook, a codebook predictor and a predicted bitmap.

This disclosure is related to neural network model compression. To be more specific, methods and apparatuses described herein are related to an escape reorder mode for neural network model compression.

In the compression of neural networks for multimedia content description and analysis, if a dimension of a weight tensor is more than two (such as a convolution layer), this weight tensor is reshaped to a two-dimensional (2D) tensor. No reshape is performed if the dimension of weight tensor is no more than two (such as a fully connected layer or a bias layer).

The encoding method scans weight coefficients in a row-first manner from left to right and scans rows from top to bottom.

TABLE 1

```
quant_weight_tensor( dimensions, maxNumNoRem ) {
  dim = Size( dimensions )
  for( i = TensorIterator( dim );!TensorIteratorEnd( i, dimensions );
  i = TensorIteratorNext( i, dimensions ) {
    quant_weight( i, maxNumNoRem )
  }
}
```

In the compression of neural networks for multimedia content description and analysis, nearest neighbour quantization is applied in a uniform way to each weight coefficient in weight matrices. A fixed step size is applied. Reconstructed values in a decoded matrix are integer multiples of the step size. The step size is defined as a 32-bit floating number.

TABLE 2

```
step_size( ) {
    step_size                      flt(32)
}
``` step_size is the quantization step size.

In the compression of neural networks for multimedia content description and analysis, each quantized weight level is encoded according to the following procedure employing an integer parameter maxNumNoRem:

In a first step, a binary syntax element sig_flag is encoded for the quantized weight level, which specifies whether a corresponding level is equal to zero. If the sig_flag is equal to one, a further binary syntax element sign_flag is encoded. A bin indicates if a current weight level is positive or negative. Next, a unary sequence of bins is encoded, followed by a fixed length sequence as follows:

A variable k is initialized with zero and X is initialized with 1<<k. A syntax element abs_level_greater_X is encoded, which indicates that an absolute value of the quantized weight level is greater than X. If abs_level_greater_X is equal to 1 and if X is greater than maxNumNoRem, the variable k is increased by 1. Afterwards, 1<<k is added to X and a further abs_level_greater_X is encoded. This procedure is continued until an abs_level_greater_X is equal to 0. Now, X must be one of values (X, X−1, ... X−(1<<k)+1). A code of length k is encoded, which points to values in a list that is an absolute quantized weight level.

Context modeling corresponds to associating three type of flags sig_flag, sign_flag, and abs_level_greater_X with context models. In this way, flags with similar statistical behavior may be associated with the same context model so that a probability estimator (inside of the context model) can adapt to underlying statistics.

The context modeling of the presented approach is as follows:

Three context models are distinguished for the sig_flag, depending on whether a neighboring quantized weight level to the left is zero, smaller than zero, or larger than zero.

Three other context models are distinguished for the sign_flag depending on whether the neighboring quantized weight level to the left is zero, smaller than zero, or larger than zero.

For the abs_level_greater_X flags, each X uses, either one or two separate context models. If X<=maxNumNoRem, two context models are distinguished depending on the sign_flag. If X>maxNumNoRem, only one context model is used.

TABLE 3

```
quant_weight( i, maxNumNoRem ) {
    QuantWeight[i] = 0
    sig_flag                                           ae(v)
    if( sig_flag ) {
        QuantWeight[i]++
        sign_flag                                      ae(v)
        j = -1
        do {
            j++
            abs_level_greater_x[j]                     ae(v)
            QuantWeight[i] += abs_level_greater_x[j]
        } while( abs_level_greater_x[j] == 1 && j < maxNumNoRem )
        if( j == maxNumNoRem ) {
            RemBits = 0
            j = -1
            do {
                j++
```

TABLE 3-continued

```
                abs_level_greater_x2[j]                ae(v)
                if( abs_level_greater_x2[j] ) {
                    RemBits++
                    QuantWeight[i] += 1 << RemBits
                }
            } while( abs_level_greater_x2[j] )
            abs_remainder                              uab(RemBits)
            QuantWeight[i] += absremainder
        }
        QuantWeight[i] = sign_flag ? -QuantWeight[i] : QuantWeight[i]
    }
}
``` sig_flag specifies whether a quantized weight QuantWeight[i] is nonzero. A sig_flag equal to 0 indicates that QuantWeight[i] is zero.

sign_flag specifies whether the quantized weight QuantWeight[i] is positive or negative. A sign_flag equal to 1 indicates that QuantWeight[i] is negative.

abs_level_greater_x[j] indicates whether an absolute level of QuantWeight[i] is greater j+1.

abs_level_greater_x2[J] includes an unary part of an exponential golomb remainder.

abs_remainder indicates a fixed length remainder.

Entropy coding may be performed on quantized weight coefficient directly. A local distribution after a weight tensor is partitioned to non-overlapping 2D/3D coding tree unit (CTU)/three-dimensional coding tree unit (CTU3D) blocks has not yet been considered. A codebook method offers more compact representation by re-indexing quantized weight coefficients in CTU/CTU3D blocks.

Methods and apparatuses for codebook coding for neural network model compression will now be described in detail.

A codebook is used to re-index quantized weight coefficients for three-dimensional coding unit (CU3D).

In an embodiment, a K-means method is utilized to generate a codebook with a size of K.

In another embodiment, a histogram-based method is utilized to generate a codebook. A codebook predictor with a size of max_predictor_size is defined to store a codebook entry that is generated from previous codebooks. A histogram of quantized coefficients is generated. Optionally, neighbour histogram bins can be combined together. Optionally, histogram bins with small frequency counts can also be removed. A quantized bin centroid is compared with all entries in a predictor using an RD-based method, and this centroid is replaced by an entry in the predictor if a better RD is obtained using the entry in the predictor. This step is repeated until all histogram bins are processed. A maximum codebook size is defined as max_codebook_size. If a number of the bins (K) is smaller than the maximum codebook size max_codebook_size, K bin centroids are selected as the codebook; otherwise, a first maximum codebook size max_codebook_size of bin centroids are selected as the codebook. In the codebook, entries that are obtained from a predictor are placed at abeginning of the codebook, followed by entries that are not obtained from predictor.

The codebook predictor is updated after this CU3D is processed, and a codebook mode is selected as a coding mode. In an embodiment, a codebook predictor is replaced by a current codebook. In another embodiment, duplicated centroids between a codebook and a predictor are removed from the predictor, then the codebook is inserted to a front of the predictor. If a total size of the new predictor is bigger than a size max_predictor_size, only first entries of the size max_predictor_size are kept, and remaining entries are removed from the predictor; otherwise, all entries are kept as the predictor.

Referring to FIG. 1, predicted codebook entries are entries that are obtained from the predictor. A size of a predicted codebook entry (predicted_size) is encoded in a bitstream. In an embodiment, the size predicted_size is treated as a syntax element and encoded directly in the bitstream. An absolute value is encoded first, followed by a sign value when the absolute value is not equal to zero. In another embodiment, the size predicted_size from a previous processed codebook is used as an offset, and a difference between a current size predicted_size and a previous size predicted_size is treated as the syntax element and encoded in the bitstream. An absolute value of the difference is encoded first, followed by a sign value when the absolute value is not equal to zero. In still another embodiment, a size from a previously-processed codebook (codebook_size) is used as an offset, and a difference between a current size predicted_size and a previous size of the previously-processed codebook (codebook_size) is treated as the syntax element and is encoded in the bitstream. An absolute value of the difference is encoded first, followed by a sign value when the absolute value is not equal to zero.

As shown in FIG. 1, in an embodiment, a bitmap array with a size of max_predictor_size (predicted_bitmap[max_predictor_size]) is defined in which predicted_bitmap[n]=0 indicates that an entry n of a codebook predictor is in a codebook, and predicted_bitmap[n]=1 indicates that the entry n of the codebook predictor is not in the codebook. Starting from a first element, content of a predict bitmap (predicted_bitmap) is encoded in a bitstream one by one, until a last 0 is encoded. Remaining elements may always be 1 so they are not encoded in the bitstream.

In another embodiment, a bitmap array with a size of max_predictor_size (predicted_bitmap[max_predictor_size]) is defined in which predicted_bitmap[n]=1 indicates that an entry n of a codebook predictor is in a codebook, pand redicted_bitmap[n]=0 indicates that the entry n of the codebook predictor is not in the codebook. Starting from a first element, content of a predicted bitmap (predicted_bitmap) is encoded in a bitstream one by one, until a last 1 is encoded. Remaining elements may always be 0 so they are not encoded in the bitstream.

An example of a corresponding syntax table is listed below in Table 4:

TABLE 4

```
predicted_codebook( ) {
   abs_predicted_diff
   if(abs_predicted_diff)
      sign
   predicted_size=(sign?-int(abs_predicted_diff):
      abs_predicted_diff)+prev_predicted_size
   for(p=0,n=0;n<max_predictor_size;++n) {
      predicted_flag
      if(predicted_flag) {
         predicted[p]=n
         codebook[n]=predictor[predicted[p++]]
      }
      if(p==predicted_size)
         break
   }
}
``` abs_predicted_diff is an absolute value of predicted_size-prev_predicted_size.

sign is a sign bit of predicted_size-prev_predicted_size.

predicted_flag is a flag for which 0 indicates that a location n is not a predicted entry, and 1 indicates that the location n is the predicted entry.

Referring to FIG. 1, signalled codebook entries are entries that are not obtained from a predictor. A size of a signalled codebook entry (signalled_size) is defined as a difference between a codebook size (codebook_size) and a predicted_size (predicted_size), and it is encoded in a bitstream. An absolute value of the difference is encoded first, followed by a sign value when the absolute value does not equal to zero.

Content of the signalled codebook entries signaled (signalled_size) are quantized weight coefficients that can be either positive or negative or zero. There are no more than two entries having same absolute value. A delta array with a size signalled_size is defined in which a delta[n] holds a difference between an absolute value of signalled[n] and an absolute value of a previously encoded codebook. In an embodiment, the previously encoded codebook for a first signalled codebook is zero. In another embodiment, the previously encoded codebook for the first signalled codebook is a last predicted codebook entry.

To encode the delta array, a significant state of delta[n] is encoded first, and if delta[n] is not equal to zero, its sign value is encoded, followed by its absolute value. The encoding of the significant state of delta[n] is skipped if an absolute value of signalled[n−1] has appeared twice in previously encoded codebook entries or previously encoded signalled codebook entries. After this, an array of a sign bit of signalled[ ] is encoded in a bitstream.

An example of a corresponding syntax table is listed below in Table 5:

TABLE 5

```
signalled_codebook( ){
   signalled_size=0
   if(predicted_size<max_codebook_size)
      signalled_size
   codebook_size=predicted_size+signalled_size
   prev=0
   for(n=predicted_size;n<codebook_size;n++){
      delta=exist=0
      if(n>=predicted_size+2)
         for(m=predicted_size;m<n-1;m++)
            if(abs_codebook[m]==abs_codebook[n-1])
               exist=1
      if(exist)
         nzflag_delta=1
      else
         nzflag_delta
      if(nzflag_delta){
         sign_delta
         abs_delta
         delta=(sign_delta?-int(abs_delta):abs_delta)
      }
      abs_codebook[n]=delta+prev
      prev=abs codebook[n]
   }
   for(n=predicted_size;n<codebook_size;n++){
      sign
      codebook[n]=(sign?-int(abs_codebook[n]):abs_codebook[n])
   }
}
``` signalled_size is a signalled codebook size.

nzflag_delta is a non-zero flag of delta.

sign_delta is a sign bit of delta.

abs_delta is an absolute value of delta.

sign is a sign bit of codebook entry.

Another example of a corresponding syntax table is listed below in Table 6:

TABLE 6

```
signalled_codebook( ){
  signalled_size=0
  if(predicted_size<max_codebook_size)
    signalled_size
  codebook_size=predicted_size+signalled_size
  prev=0                                                     An
                                                             embodiment
  prev=(predicted_size)?abs(codebook[predictedsize-1]):0    Another
                                                             embodiment
  for(n=predicted_size;n<codebook_size;n++){
    delta=exist=0
    if(n+predicted_size>=2)
      for(m=0;m<n-1;m++)
        if(abs_codebook[m]==abs_codebook[n-1])
          exist=1
    if(exist)
      nzflag_delta=1
    else
      nzflag_delta
    if(nzflag_delta){
      sign_delta
      abs_delta
      delta=(sign_delta?-int(abs_delta):abs_delta)
    }
    abs_codebook[n]=delta+prev
    prev=abs_codebook[n]
  }
  for(n=predicted_size;n<codebook_size;n++){
    sign
    codebook[n]=(sign?-int(abs_codebook[n]):
abs codebook[n])
  }
}
```

In an embodiment, for every quantized weight coefficient (Q) in CU3D, an absolute difference between the respective quantized weight coefficient Q and all codebook entries are calculated, and a codebook index (n) corresponding to the smallest absolute difference is selected as an codebook index of the respective quantized weight coefficient Q. An index map of this CU3D is constructed using all codebook indices of weight coefficients.

In another embodiment, for every quantized weight coefficient (Q) in CU3D, an absolute difference between the respective quantized weight coefficient Q and all codebook entries are calculated, the a codebook index (n) corresponding to the smallest absolute difference is selected for an additional RD calculation (rd_codebook). An RD (rd_escape) of coding this quantized weight coefficient is also calculated. If the additional RD calculation (rd_codebook) is smaller than the RD (rd_escape), this codebook index (n) is selected as the codebook index of the respective quantized weight coefficient Q. Otherwise, a special escape index, defined as a size of a codebook, is used as the codebook index of the respective quantized weight coefficient Q. An index map of this CU3D is constructed using codebook indices and escape indices of the weight coefficients.

An encoding algorithm is applied to both quantized weight coefficients and index map coefficients, and one mode with a better RD is chosen as a winner. This mode decision is encoded implicitly in a bitstream, the mode that does not use codebook can be inferred when both a predicted size (predicted_size) and a signaled size (signalled_size) are equal to zero.

Methods and apparatuses for an escape reorder mode for neural network model compression will now be described in detail.

Figure 2:
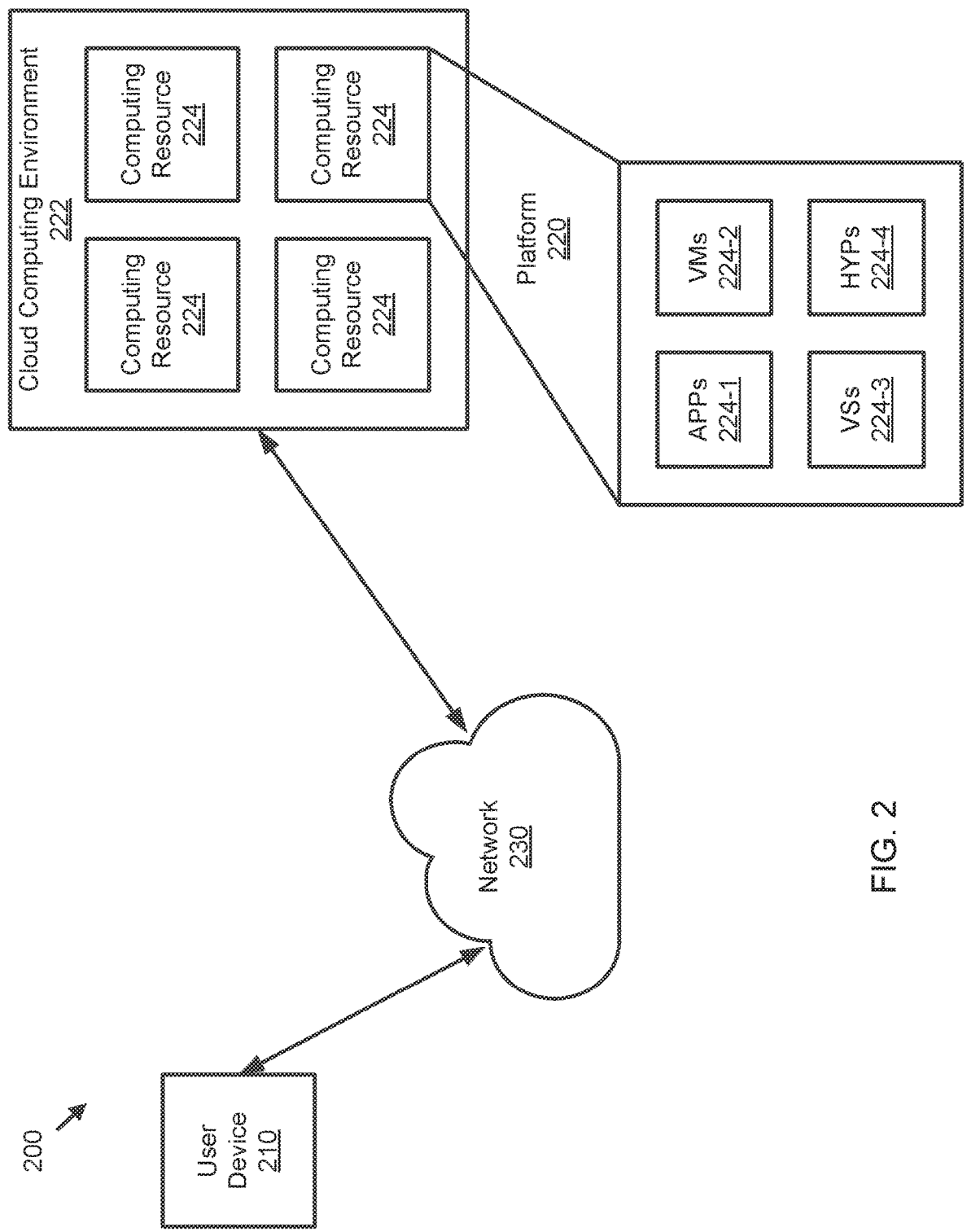
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
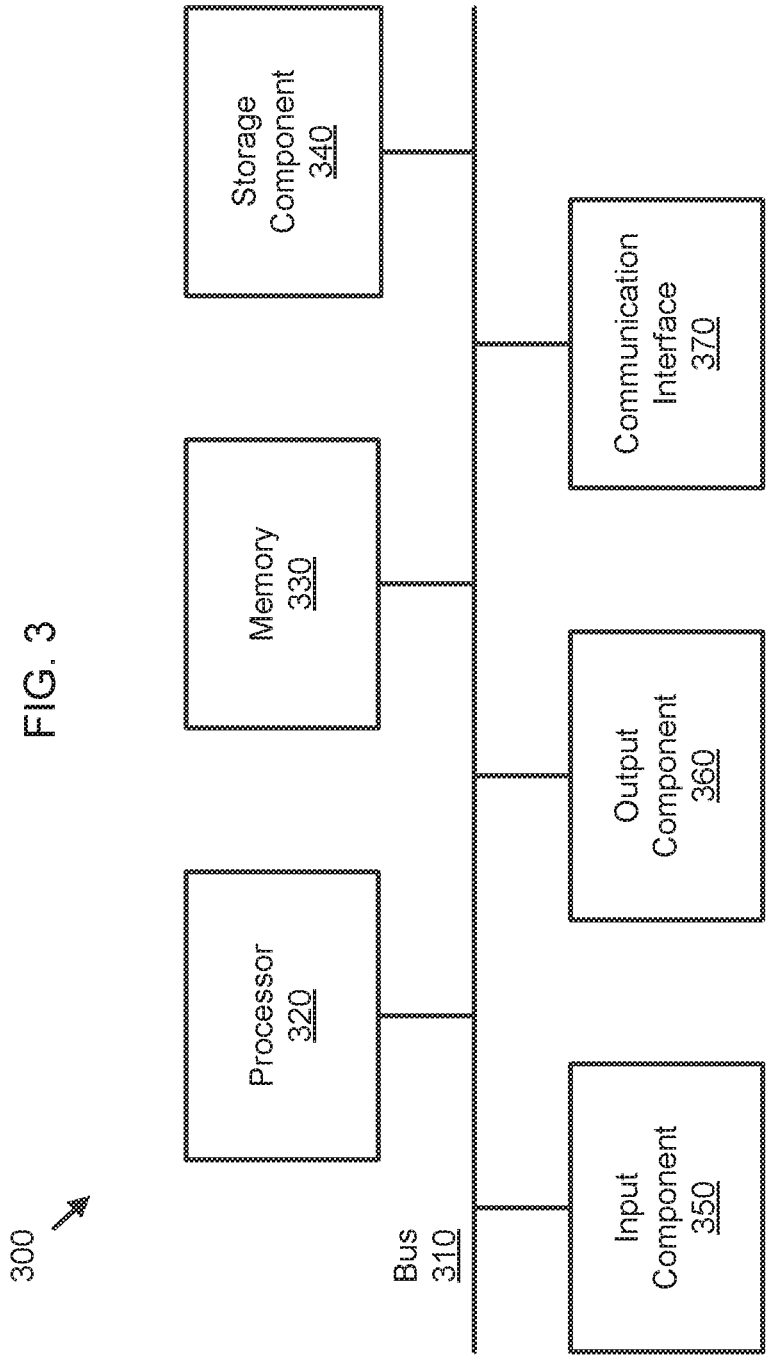
FIG. 3 is a block diagram of example components of one or more devices of FIG. 2.

FIG. 3 is a block diagram of example components of one or more devices of FIG. 2. The device 300 may correspond to the user device 210 and/or the platform 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
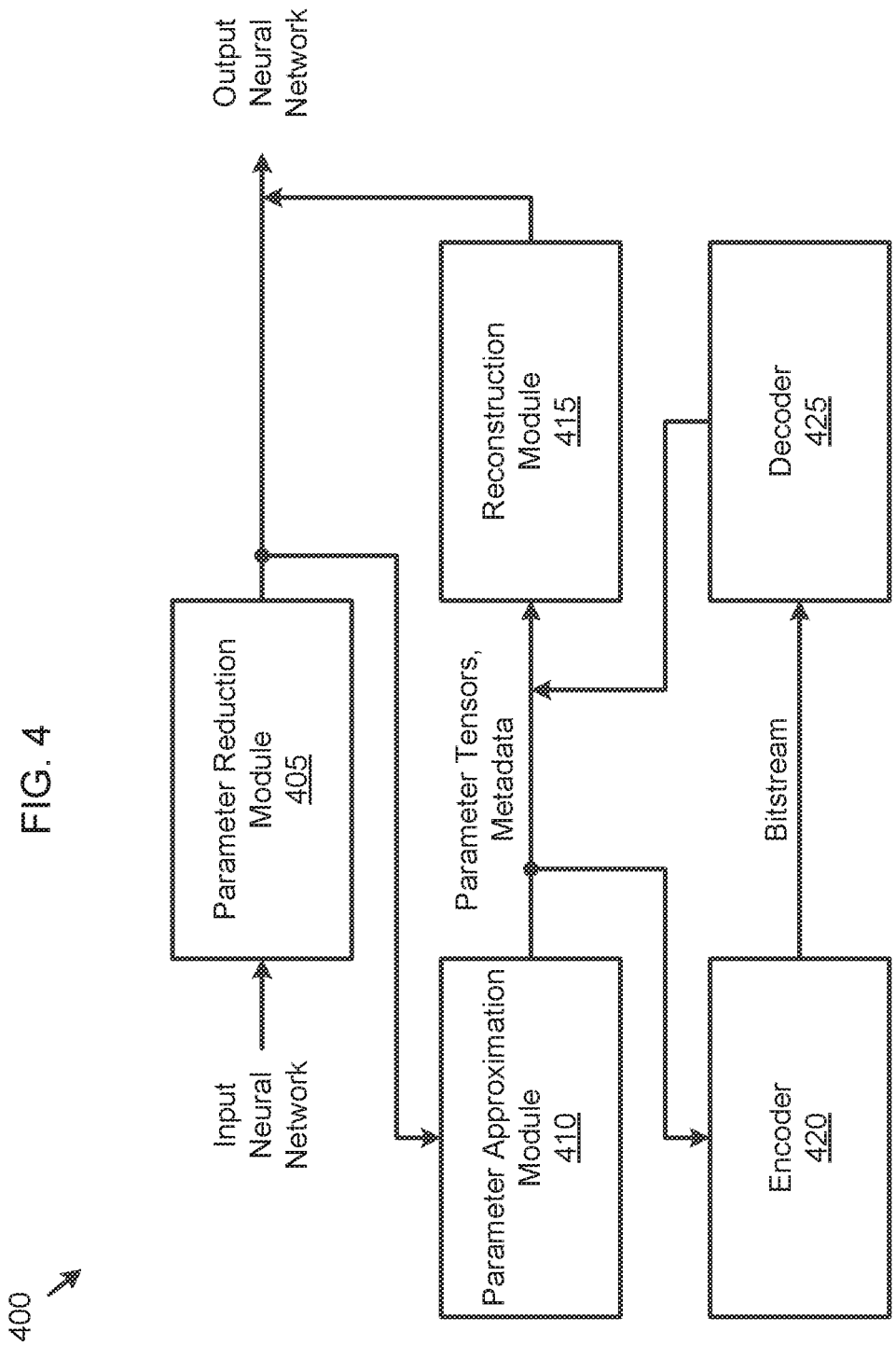
FIG. 4 is a functional block diagram of a system for neural network model compression, according to embodiments.

FIG. 4 is a functional block diagram of a system 400 for neural network model compression, according to embodiments.

As shown in FIG. 4, the system 400 includes a parameter reduction module 405, a parameter approximation module 410, a reconstruction module 415, an encoder 420, and a decoder 425.

The parameter reduction module 405 reduces a set of parameters of an input neural network, to obtain an output neural network. The neural network may include the parameters and an architecture as specified by a deep learning framework.

For example, the parameter reduction module 405 may sparsify (set weights to zero) and/or prune away connections of the neural network. In another example, the parameter reduction module 405 may perform matrix decomposition on parameter tensors of the neural network into a set of smaller parameter tensors. The parameter reduction module 405 may perform these methods in cascade, for example, may first sparsify the weights and then decompose a resulting matrix.

The parameter approximation module 410 applies parameter approximation techniques on parameter tensors that are extracted from the output neural network that is obtained from the parameter reduction module 405. For example, the techniques may include any one or any combination of quantization, transformation and prediction. The parameter approximation module 410 outputs first parameter tensors that are not modified by the parameter approximation module 410, second parameter tensors that are modified or approximated by the parameter approximation module 410, and respective metadata to be used to reconstruct original parameter tensors that are not modified by the parameter approximation module 410, from the modified second parameter tensors.

The reconstruction module 415 reconstructs the original parameter tensors from the modified second parameter tensors that are obtained from the parameter approximation module 410 and/or the decoder 425, using the respective metadata that is obtained from the parameter approximation module 410 and/or the decoder 425. The reconstruction module 415 may reconstruct the output neural network, using the reconstructed original parameter tensors and the first parameter tensors.

The encoder 420 may perform entropy encoding on the first parameter tensors, the second parameter tensors and the respective metadata that are obtained from the parameter approximation module 410. This information may be encoded into a bitstream to the decoder 425.

The decoder 425 may decode the bitstream that is obtained from the encoder 420, to obtain the first parameter tensors, the second parameter tensors and the respective metadata.

The system 400 may be implemented in the platform 220, and one or more modules of FIG. 4 may be performed by a device or a group of devices separate from or including the platform 220, such as the user device 210.

In embodiments, an escape index, defined as a size of a codebook, is a special index where a coefficient represented by the escape index can have different quantized coefficient values. An index map of this CU3D is constructed using codebook indices and escape indices of weight coefficients. Depending on a frequency (a frequency count or a number amount in a histogram, or a rate distortion) of an escape index in a current CU3D, the index map of this CU3D may be modified so that the escape index is represented by 0 or a predetermined number n, and each non-escape index is represented by its original codebook index plus one. A flag is defined in nnr_header to indicate if this step is allowed. If yes, a flag is defined in a CU3D syntax section to indicate if this step is performed in a current CU3D. This codebook escape mode decision increases bitstream efficiency because a smaller codebook is encoded. Further, the codebook escape mode decision keeps the codebook at a predetermined size, without exceeding this predetermined size.

An example of a corresponding syntax Table 7 is listed below:

TABLE 7 nnr_header( ) {
......
    enable_escape_reorder
......
} enable_escape_reorder may be 0 indicating that escape reorder is not allowed, or 1 indicating that the escape reorder is allowed.

TABLE 8 cu3d(depth,y_idx,x_idx){
......
    if(ctu3d_map_mode_flag)
        map_mode
    start_depth_delta=0
    if(enable_start_depth)
        start_depth_delta
    start_depth=total_depth-1-start_depth_delta
    cbook_esc_mode=0
    if(enable_escape_reorder)
        cbook_esc_mode
    if(map_mode==0){
        uni_mode
        if(uni_mode)
            unitree3d(start_depth,0,0,0,0,false)
        else
            octree3d(start_depth,0,0,0,0,false)
    }elseif(map_mode==1)
        tagtreeSd(start_depth,0,0,0,0,false)
    escape( )

TABLE 8-continued

```
      ......
   }
``` split_flag is a flag to indicate if a parent CU3D is split to 4 smaller child CU3Ds.

map_mode may be 0 indicating that an Octree method is selected, or 1 indicating that Tagtree3d method is selected.

start_depth_delta may be expressed in an equation: start_depth=total_depth-1-start_depth_delta.

cbook_esc_mode may be 0 indicating that escape is not reordered, or 1 indicating that escape is reordered.

uni_mode may be 0 indicating that an Octree method is selected, or 1 indicating that a Unitree3d method is selected.

In a codebook coding method, an escape index is a special index where a coefficient represented by the escape index can have different quantized coefficient values. A quantized coefficient value for all escape indices is to be encoded in a bitstream explicitly.

After a 3D-Octree or 3D-Tagtree coding is completed, an escape coding procedure is launched if a codebook coding method is used. All codebook indices are scanned, and if an escape index is found, a non-zero flag of a corresponding quantized coefficient value is encoded. If a coefficient value is not zero, a sign bit followed by an absolute value of the quantized coefficient value are encoded. For decoding, if an index is non-zero, a codebook is used. If the index is an escape index (0 or n), the codebook is not used, but instead a bitstream is used for decoding.

An example of corresponding syntax table of Table 9 is listed below:

TABLE 9

```
escape( ){
   ......
   if(codebook_size)
      escape_index=(cbook_esc_mode)?codebook_size:0
      for(z=0;z<cu_cdepth;++z)
         for(y=0;y<cu_height;++y)
            for(x=0;x<cu_width;++x)
               if(map[z][y][x]==escape_index){
                  q=0
                  nzflag
                  if(nzflag){
                     sign
                     abs_q
                     q=(sign?-int(abs_q):abs_q)
                  }
               }else{
                  q=(cbook_esc_mode)?codebook[map[z][y][x]]: codebook[map[z][y][x]-1]
               }
   ......
}
``` nzflag is a non-zero flag.

sign is a sign bit.

abs_q is a quantized coefficient q=(sign?-int(abs_q): abs_q).

Figure 5:
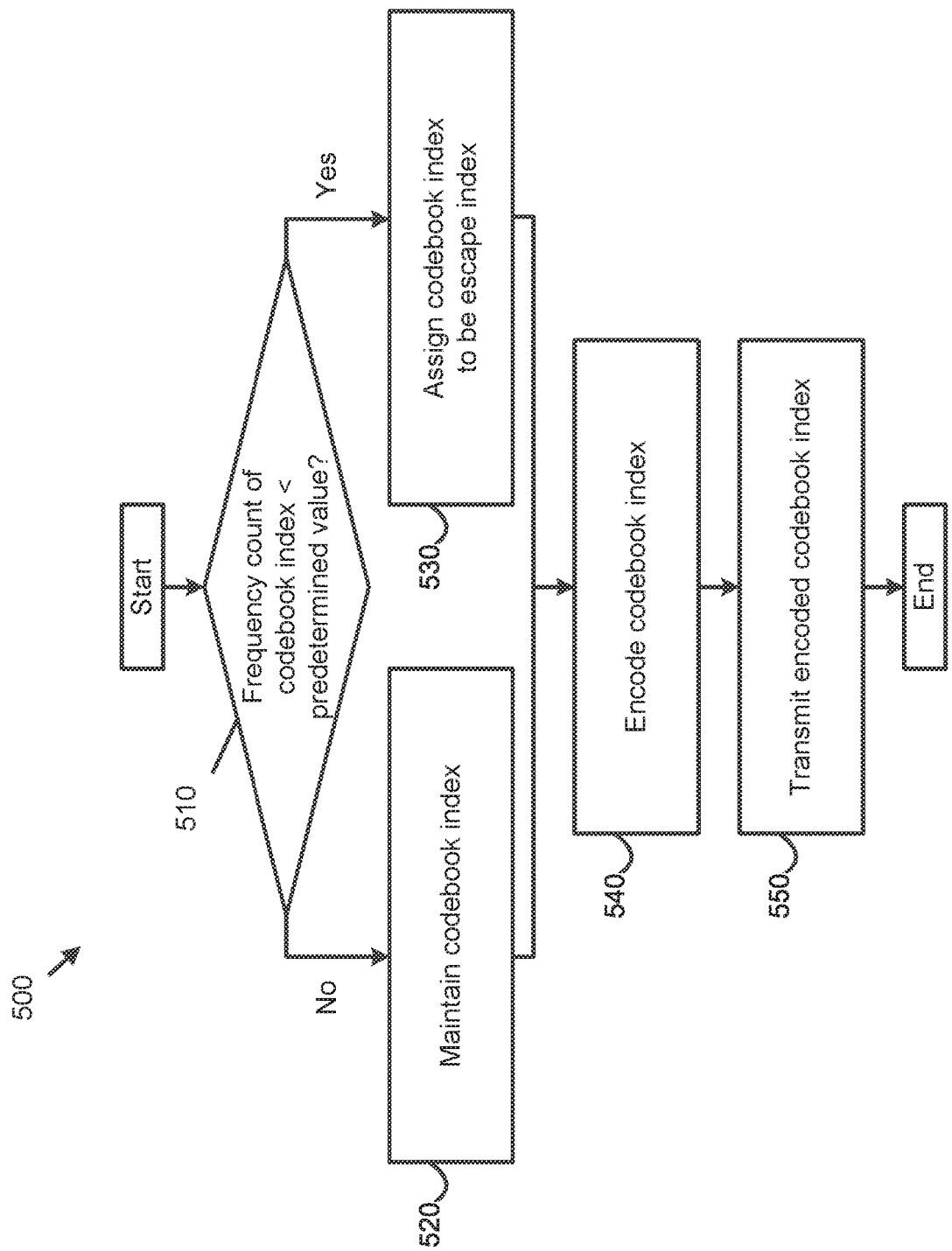
FIG. 5 is a flowchart of a method of an escape reorder mode for neural network model compression, according to embodiments.

FIG. 5 is a flowchart of a method 500 of an escape reorder mode for neural network model compression, according to embodiments. In some implementations, one or more process blocks of FIG. 5 may be performed by the platform 220. In some implementations, one or more process blocks of FIG. 5 may be performed by another device or a group of devices separate from or including the platform 220, such as the user device 210.

As shown in FIG. 5, in operation 510, the method 500 includes determining whether a frequency count of a codebook index included in a predicted codebook is less than a predetermined value, the codebook index corresponding to a neural network.

In operation 520, the method 500 includes, based on the frequency count of the codebook index being determined to be greater than the predetermined value (operation 510-No), maintaining the codebook index.

In operation 530, the method 500 includes, based on the frequency count of the codebook index being determined to be less than the predetermined value (operation 510-Yes), assigning the codebook index to be an escape index of 0 or a predetermined number.

In operation 540, the method 500 includes encoding the codebook index.

In operation 550, the method 500 includes transmitting the encoded codebook index.

The method 500 may further include determining whether a first flag indicates that the escape reorder mode is used. The determining whether the frequency count of the codebook index is less than the predetermined value may include, based on the first flag being determined to indicate that the escape reorder mode is used, determining whether the frequency count of the codebook index is less than the predetermined value.

The first flag may be included in a syntax section of a three-dimensional coding unit (CU3D) corresponding to the codebook index.

The method 500 may further include determining whether a second flag indicates that the first flag is included in the syntax section of the CU3D. The determining whether the first flag indicates that the escape reorder mode is used may include, based on the second flag being determined to indicate that the first flag is included in the syntax section of the CU3D, determining whether the first flag indicates that the escape reorder mode is used.

The encoding the codebook index may include determining whether the codebook index is the escape index.

The encoding the codebook index may further include, based on the codebook index being determined to be the escape index, encoding a non-zero flag of the codebook index.

The encoding the codebook index may further include, based on the codebook index being determined to not be the escape index, encoding a sign bit followed by an absolute value of the codebook index.

Figure 6:
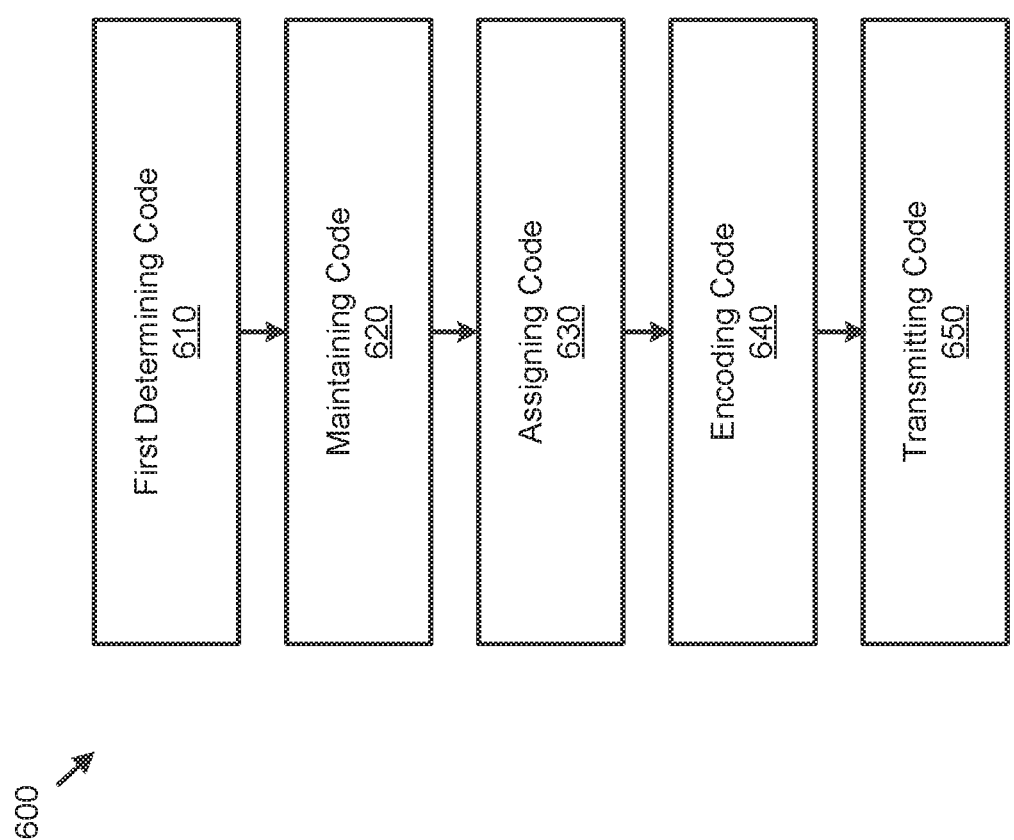
FIG. 6 is a block diagram of an apparatus for an escape reorder mode for neural network model compression, according to embodiments.

FIG. 6 is a diagram of an apparatus 600 for an escape reorder mode for neural network model compression, according to embodiments. As shown in FIG. 6, the apparatus 600 includes first determining code 610, maintaining code 620, assigning code 630, encoding code 640 and transmitting code 650.

The first determining code 610 is configured to cause at least one processor to determine whether a frequency count of a codebook index included in a predicted codebook is less than a predetermined value, the codebook index corresponding to a neural network.

The maintaining code 620 is configured to cause the at least one processor to, based on the frequency count of the codebook index being determined to be greater than the predetermined value, maintain the codebook index.

The assigning code 630 is configured to cause the at least one processor to, based on the frequency count of the codebook index being determined to be less than the predetermined value, assign the codebook index to be an escape index of 0 or a predetermined number.

The encoding code 640 is configured to cause the at least one processor to encode the codebook index.

The transmitting code 650 is configured to cause the at least one processor to transmit the encoded codebook index.

The apparatus 600 may further include second determining code configured to cause the at least one processor to determine whether a first flag indicates that the escape reorder mode is used. The first determining code 610 may be further configured to cause the at least one processor to, based on the first flag being determined to indicate that the escape reorder mode is used, determine whether the frequency count of the codebook index is less than the predetermined value.

The first flag may be included in a syntax section of a three-dimensional coding unit (CU3D) corresponding to the codebook index.

The apparatus 600 may further include third determining code configured to cause the at least one processor to determine whether a second flag indicates that the first flag is included in the syntax section of the CU3D. The second determining code may be further configured to cause the at least one processor to, based on the second flag being determined to indicate that the first flag is included in the syntax section of the CU3D, determine whether the first flag indicates that the escape reorder mode is used.

The encoding code 640 may be further configured to cause the at least one processor to determine whether the codebook index is the escape index.

The encoding code 640 may be further configured to cause the at least one processor to, based on the codebook index being determined to be the escape index, encode a non-zero flag of the codebook index.

The encoding code 640 may be further configured to cause the at least one processor to, based on the codebook index being determined to not be the escape index, encode a sign bit followed by an absolute value of the codebook index.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of an escape reorder mode for neural network model compression, the method being performed by at least one processor, and the method comprising:
    determining whether a frequency count of a codebook index included in a predicted codebook is less than a predetermined value, the codebook index corresponding to a neural network;
    based on the frequency count of the codebook index being determined to be greater than the predetermined value, maintaining the codebook index;
    based on the frequency count of the codebook index being determined to be less than the predetermined value, assigning the codebook index to be an escape index of 0 or a predetermined number;
    encoding the codebook index; and
    transmitting the encoded codebook index.

2. The method of claim 1, further comprising determining whether a first flag indicates that the escape reorder mode is used,
    wherein the determining whether the frequency count of the codebook index is less than the predetermined value comprises, based on the first flag being determined to indicate that the escape reorder mode is used, determining whether the frequency count of the codebook index is less than the predetermined value.

3. The method of claim 2, wherein the first flag is included in a syntax section of a three-dimensional coding unit (CU3D) corresponding to the codebook index.

4. The method of claim 3, further comprising determining whether a second flag indicates that the first flag is included in the syntax section of the CU3D,
    wherein the determining whether the first flag indicates that the escape reorder mode is used comprises, based on the second flag being determined to indicate that the first flag is included in the syntax section of the CU3D, determining whether the first flag indicates that the escape reorder mode is used.

5. The method of claim 1, wherein the encoding the codebook index comprises determining whether the codebook index is the escape index.

6. The method of claim 5, wherein the encoding the codebook index further comprises, based on the codebook index being determined to be the escape index, encoding a non-zero flag of the codebook index.

7. The method of claim 5, wherein the encoding the codebook index further comprises, based on the codebook index being determined to not be the escape index, encoding a sign bit followed by an absolute value of the codebook index.

8. An apparatus for an escape reorder mode for neural network model compression, the apparatus comprising:
    at least one memory configured to store program code; and at least one processor configured to read the program code and operate as instructed by the program code, the program code comprising:

first determining code configured to cause the at least one processor to determine whether a frequency count of a codebook index included in a predicted codebook is less than a predetermined value, the codebook index corresponding to a neural network;

maintaining code configured to cause the at least one processor to, based on the frequency count of the codebook index being determined to be greater than the predetermined value, maintain the codebook index;

assigning code configured to cause the at least one processor to, based on the frequency count of the codebook index being determined to be less than the predetermined value, assign the codebook index to be an escape index of 0 or a predetermined number;

encoding code configured to cause the at least one processor to encode the codebook index; and transmitting code configured to cause the at least one processor to transmit the encoded codebook index.

9. The apparatus of claim 8, further comprising second determining code configured to cause the at least one processor to determine whether a first flag indicates that the escape reorder mode is used, wherein the first determining code is further configured to cause the at least one processor to, based on the first flag being determined to indicate that the escape reorder mode is used, determine whether the frequency count of the codebook index is less than the predetermined value.

10. The apparatus of claim 9, wherein the first flag is included in a syntax section of a three-dimensional coding unit (CU3D) corresponding to the codebook index.

11. The apparatus of claim 10, further comprising third determining code configured to cause the at least one processor to determine whether a second flag indicates that the first flag is included in the syntax section of the CU3D, wherein the second determining code is further configured to cause the at least one processor to, based on the second flag being determined to indicate that the first flag is included in the syntax section of the CU3D, determine whether the first flag indicates that the escape reorder mode is used.

12. The apparatus of claim 8, wherein the encoding code is further configured to cause the at least one processor to determine whether the codebook index is the escape index.

13. The apparatus of claim 12, wherein the encoding code is further configured to cause the at least one processor to, based on the codebook index being determined to be the escape index, encode a non-zero flag of the codebook index.

14. The apparatus of claim 12, wherein the encoding code is further configured to cause the at least one processor to, based on the codebook index being determined to not be the escape index, encode a sign bit followed by an absolute value of the codebook index.

15. A non-transitory computer-readable medium storing instructions that, when executed by at least one processor for an escape reorder mode for neural network model compression, cause the at least one processor to:

determine whether a frequency count of a codebook index included in a predicted codebook is less than a predetermined value, the codebook index corresponding to a neural network;

based on the frequency count of the codebook index being determined to be greater than the predetermined value, maintain the codebook index;

based on the frequency count of the codebook index being determined to be less than the predetermined value, assign the codebook index to be an escape index of 0 or a predetermined number;

encode the codebook index; and transmit the encoded codebook index.

16. The non-transitory computer-readable medium of claim 15, wherein the instructions, when executed by the at least one processor, further cause the at least one processor to:

determine whether a first flag indicates that the escape reorder mode is used; and based on the first flag being determined to indicate that the escape reorder mode is used, determine whether the frequency count of the codebook index is less than the predetermined value.

17. The non-transitory computer-readable medium of claim 16, wherein the first flag is included in a syntax section of a three-dimensional coding unit (CU3D) corresponding to the codebook index.

18. The non-transitory computer-readable medium of claim 17, wherein the instructions, when executed by the at least one processor, further cause the at least one processor to:

determine whether a second flag indicates that the first flag is included in the syntax section of the CU3D; and based on the second flag being determined to indicate that the first flag is included in the syntax section of the CU3D, determine whether the first flag indicates that the escape reorder mode is used.

19. The non-transitory computer-readable medium of claim 15, wherein the instructions, when executed by the at least one processor, further cause the at least one processor to determine whether the codebook index is the escape index.

20. The non-transitory computer-readable medium of claim 19, wherein the instructions, when executed by the at least one processor, further cause the at least one processor to, based on the codebook index being determined to be the escape index, encode a non-zero flag of the codebook index.

* * * * *